United States Patent
Yamauchi et al.

(10) Patent No.: US 6,914,395 B2
(45) Date of Patent: Jul. 5, 2005

(54) ELECTRONIC BALLAST FOR A HIGH-PRESSURE DISCHARGE LAMP

(75) Inventors: Tokushi Yamauchi, Hirakata (JP); Tsutomu Shiomi, Kitakatsuragi-gun (JP); Minoru Maehara, Matsubara (JP); Yutaka Iwahori, Kadoma (JP); Toshiaki Nakamura, Kadoma (JP); Takeshi Kamoi, Woburn, MA (US)

(73) Assignee: Matsushita Electric Works, Ltd., Kadoma (JP)

( * ) Notice: Subject to any disclaimer, the term of this patent is extended or adjusted under 35 U.S.C. 154(b) by 0 days.

(21) Appl. No.: 10/473,361
(22) PCT Filed: Nov. 26, 2002
(86) PCT No.: PCT/JP02/12339
§ 371 (c)(1),
(2), (4) Date: Sep. 30, 2003
(87) PCT Pub. No.: WO03/047319
PCT Pub. Date: Jun. 5, 2003

(65) Prior Publication Data
US 2004/0113567 A1 Jun. 17, 2004

(30) Foreign Application Priority Data
Nov. 27, 2001 (JP) ...................................... 2001-360168
Nov. 27, 2001 (JP) ...................................... 2001-360184

(51) Int. Cl.[7] .............................................. H05B 41/36
(52) U.S. Cl. ...................... 315/308; 315/224; 315/291; 315/360
(58) Field of Search ........................ 315/129, 224–225, 315/246–247, 291, 299, 307–308, 360, DIG. 7, 226, 309

(56) References Cited

U.S. PATENT DOCUMENTS

| | | | | |
|---|---|---|---|---|
| 5,465,029 | A | * 11/1995 | Hanazaki et al. | ........... 315/308 |
| 5,942,859 | A | * 8/1999 | Okude et al. | ............... 315/291 |
| 6,208,088 | B1 | * 3/2001 | Konishi et al. | ............. 315/291 |
| 6,288,501 | B1 | * 9/2001 | Nakamura et al. | .......... 315/307 |

FOREIGN PATENT DOCUMENTS

| | | |
|---|---|---|
| JP | 3-59995 | 3/1991 |
| JP | 7-85986 | 3/1995 |
| JP | 11-238585 | 8/1999 |
| JP | 11-307291 | 11/1999 |
| JP | 2001-210485 | 8/2001 |
| JP | 2001-210490 | 8/2001 |
| JP | 2001-230089 | 8/2001 |

* cited by examiner

Primary Examiner—Thuy V. Tran
(74) Attorney, Agent, or Firm—Oblon, Spivak, McClelland, Maier & Neustadt, P.C.

(57) ABSTRACT

An electronic ballast for a high intensity discharge lamp (HID) includes a power converters, a controller, and a lamp power switch. In the power converter, an input DC voltage is converted into a ballast output power for lighting the HID lamp. The controller has a function to control the power converter and change the ballast output power. The lamp power switch detects a lamp output parameter indicated after the HID lamp starts discharge, identifies a lamp power of the HID lamp according to the lamp output parameter, and gives an identification signal indicating the lamp power. In response to this identification signal, the power converter outputs the ballast output power which matches with the lamp power identified.

24 Claims, 11 Drawing Sheets

ELECTRONIC BALLAST FOR A HIGH-PRESSURE DISCHARGE LAMP

BACKGROUND OF THE INVENTION

1. Field of the Invention

The present invention relates to an electronic ballast for a high intensity discharge lamp. More specifically, the invention relates to an electronic ballast for a high intensity discharge lamp that enables high intensity discharge lamps having different rated powers to be lit according to the rated powers.

2. Description of the Prior Art

Japanese Patent Publication H7-66864 discloses a ballast for lighting two or more fluorescent lamps having different rated powers. The ballast is so designed as to determine the rated power of a fluorescent lamp by taking advantage of the fact that different starting voltages are applied to start fluorescent lamps having different rated powers. In addition, the ballast is so designed as to supply a current according to the determined power. In other words, the ballast determines the rated powers of fluorescent lamps from the difference among the starting voltages applied to start the lamps discharging.

By contrast, even if high intensity discharge (HID) lamps have different rated powers, a nearly equal starting voltage is applied to start the HID lamps discharging. This makes it impossible to apply to the HID lamps the art disclosed by the foregoing publication.

SUMMARY OF THE INVENTION

In view of the above problem, the object of the present invention is to provide an electronic ballast for a high intensity discharge lamp that can discriminate high intensity discharge lamps having different rated powers and light them at the discriminated rated lamp powers. The electronic ballast for a high intensity discharge lamp according to the present invention includes a power converter and a controller. The power converter converts an input DC voltage into a ballast output power for driving the HID lamp. The ballast output power is applied to the HID lamp. The controller controls the power converter to vary the ballast output power. The ballast further includes a lamp power switching means. The lamp power switching means monitors a lamp output parameter that the HID lamp exhibits after it starts discharging, and discriminates a rated lamp power of the HID lamp based upon the monitored lamp output parameter, and provides a lamp power signal indicative of the discriminated rated lamp power. The controller receives the lamp power signal and causes the power converter to output the ballast output power in match with the rated lamp power.

Thus, it is possible to detect the lamp output parameter that the HID lamp exhibits after it starts discharging, and to discriminate the rated lamp power based on the detected parameter. This makes it possible to automatically discriminate the rated power of an HID lamp in use, thereby providing a suitable ballast output matching the rated lamp power so that a sufficient optical output can be provided for the performance of the lamp.

In order to quickly provide a suitable optical output, it is preferable that the foregoing discrimination be performed before the HID lamp reaches its stable lamp operating condition. In general, as shown in FIG. 3, immediately after an HID lamp starts operating (0<elapsed time T<t1), its lamp voltage Vla is low, and its lamp current Ila is large, that is, its lamp impedance is low on the order of some ohms. As the HID lamp changes to its stable lamp operating condition (t1<T<t2), the impedance gradually rises. When the HID lamp is in the stable lamp operating condition (T>t2), the impedance is on the order of some hundreds of ohms. Thus, the HID lamp does not change to the stable lamp operating condition in an instant. By taking advantage of an output characteristic of the HID lamp during this transition period, it is possible to discriminate the rated power of the lamp. For example, the output parameter may be the lamp voltage Vla, which varies greatly with time during the transition period (T<t2), as shown in FIG. 4. This variation differs distinctively in degree among the rated powers of HID lamps in use if the ballast output power is fixed. Specifically, if the ballast output power is 70 W, as shown in FIG. 4, the lamp voltage Vla of an HID lamp having a rated lamp power of 70 W rises earlier than that of an HID lamp having a rated lamp power of 150 W. A preferred embodiment of the present invention is based on the recognition that, during the transition period before the time when an HID lamp is stably lit, the output characteristics of the lamp, which are represented by its lamp voltage Vla, are effective in discriminating its rated lamp power.

As shown in FIG. 4, HID lamps having different rated powers exhibit different lamp voltages V1 and V2 at a point T1 when a predetermined time has passed after the lamps have just started operating. One method is to take advantage of this fact to compare the lamp voltage Vla of an HID lamp at the point T1 with a predetermined reference value Vref, thereby discriminating the rated power of the lamp. In this case, the lamp power switching means includes a monitor, a timer and a lamp discriminator. The monitor keeps monitoring the lamp output parameter before the HID lamp comes into the stable lamp operating condition. The timer starts counting a timer when the HID lamp starts discharging, and outputs an enabling signal when the counted timer exceeds a predetermined time. The comparator (the lamp discriminator) compares the lamp output parameter with a predetermined reference value upon receiving the enabling signal, and provides the lamp power signal when the lamp output parameter satisfies a predetermined criteria. The controller, in response to the lamp power signal, operates to vary the ballast output power in such a direction that the resulting lamp output parameter does not satisfy the predetermined criteria. Specifically, if the lamp output parameter, which is the lamp voltage Vla in this case, of an HID lamp driven at a constant ballast output power, satisfies the reference value Vref and the criterion (Vla<or >Vref), it is determined that the ballast output power differs from the rated power of the lamp. On the basis of this determination, the ballast output power is changed in such a direction that it matches with the rated lamp power.

After HID lamps having different rated powers have just started operating, as shown in FIG. 4, it takes their lamp voltages different lengths of time T1 and T2 to reach a predetermined value V2. Another method is to take advantage of this fact to compare these lengths of time with a reference time, thereby discriminating the rated powers of the lamps. In this case, the lamp power switching means includes a monitor, a timer and a lamp discriminator. The monitor monitors the lamp output parameter before the HID lamp comes into a stable lamp operating condition, and provides a detection signal when the lamp output parameter exceeds a critical level. The timer starts counting a time when the HID lamp starts discharging and stops counting the time upon receiving the detection signal, thereby giving an accumulated time period T1 or T2 between the two events.

The lamp discriminator compares the accumulated time period with a predetermined reference time Tref and provides the lamp power signal when the accumulated time satisfies a predetermined criteria (for example, T2>Tref). The controller, in response to the lamp power signal, operates to vary the ballast output power in a such a direction that the resulting lamp output parameter does not satisfy the predetermined criteria (for example, T2<Tref). For example, a ballast output power of 70 W may be supplied to an HID lamp having an unknown rated lamp power. In this case, as shown in FIG. 4, it is determined that the rated power of this HID lamp is 150 W if the reference time Tref is exceeded by the time T2, which it takes the lamp voltage Vla as a lamp output parameter detected by the monitor to reach V2. On the basis of this determination, the ballast output power is increased up to 150 W.

The lamp output parameter is not limited to the illustrated lamp voltage, but may be the lamp current or the optical characteristic that the HID lamp exhibits after it starts discharging and before it comes into the stable lamp operating condition.

It is preferable that the lamp power switching means should function to compensate for the output characteristic variation of the HID lamp when the lamp restarts. When the HID lamp is restarted, i.e., it is lit in a relatively short time after it is switched off, the lamp output characteristic during the transition period exhibits a variation different from that during the normal lighting time. In order to compensate this variation, the lamp power switching means includes a rest counter. The rest counter records a lamp rest time from a turn-off of the ballast to a restarting of the ballast, and provides a rest signal which varies the reference value or the reference time in accordance with the lamp rest time. This makes it possible to accurately discriminate the rated lamp power even when the HID lamp restarts.

It is preferable that the lamp power switching means should further include a lamp aging monitor. The lamp aging monitor monitors the lamp output parameter to determine a degree of a lamp aging. The lamp aging monitor provides an aging signal indicative of the degree which varies the reference value or the accumulated time period for compensation of the lamp aging in discriminating the rated lamp power. This makes it possible to provide a suitable ballast output power by compensating the rated lamp power, which varies as the HID lamp ages.

The rated power of the HID lamp may be discriminated after the lamp reaches its stable lamp operating condition. After the HID lamp reaches the stable lamp operating condition, its lamp output parameters, which include the lamp voltage, are constant values. However, the lamp output parameters vary with the rated lamp power. This characteristic is utilized to discriminate the rated lamp power. Specifically, as shown in FIG. 8, for example, if the ballast output power is 70 W, an HID lamp having a rated power of 70 W stabilizes at a lamp voltage V1 (point A), while an HID lamp having a rated power of 150 W stabilizes at a lamp voltage V2 (point B). As also shown, if the ballast output power is 150 W, the HID lamp having a rated power of 150 W stabilizes at the lamp voltage V1 (point C). Accordingly, by knowing such relationships in advance, it is possible to discriminate the rated power of an HID lamp on the basis of the lamp voltage that the lamp exhibits after it receives a ballast output power and reaches its stable lamp operating condition. In this case, the lamp power switching means includes a monitor, a timer, a memory and a processor. The monitor keeps monitoring the lamp output parameter after the HID lamp comes into the stable lamp operating condition. The timer starts counting a time when the HID lamp starts discharging and provides an enabling signal when the counted time exceeds a predetermined time. The memory stores the lamp output parameters that different HID lamps exhibit after reaching their stable lamp operating conditions. Each of the lamp output parameters is predetermined for a combination of the ballast output power and rated lamp power. Specifically, the memory stores the output parameters that HID lamps having different rated powers exhibit when they are driven at a predetermined ballast output power. Receiving the enabling signal from the timer, the processor references the memory to locate one of the rated lamp power in match with the lamp output parameter being monitored, and provides the lamp power signal indicative of the located lamp power. Receiving the lamp power signal, the controller operates to vary the ballast output power in match with the located rated lamp power. Accordingly, after an HID lamp reaches its stable lamp operating condition, it is possible to reliably discriminate the rated power of the lamp and provide a ballast output power adequate for the discriminated power. In this case, too, the lamp output parameter is not limited to the lamp voltage, but may be the lamp current, the optical characteristic or another characteristic.

The discrimination of rated lamp power may be performed two or more times. To this end, the timer provides another enabling signal after a predetermined interval from the time of providing the enabling signal first so that the processor responds to provide another lamp power signal indicative of the rated lamp power located at the timing of providing the another enabling signal, whereby the controller operates to vary the ballast output power in match with the rated lamp power located last.

In a preferred embodiment of the present invention, by optionally selecting an initial ballast output power, it is possible to select a lighting system for which either quick starting or a long life is regarded as important. To this end, the lamp power switching means includes a memory and a selector. The memory stores a plurality of different the ballast output powers. The selector selects one of the ballast output powers as a default one to be initially supplied to the HID lamp. The selector has an input terminal for receiving an external signal by which the selector is activated to select any one of the ballast output powers as the default one. Accordingly, for example, a remote control may be used to set any one of the ballast output powers. This enables the lamp user to select a preferred lighting system for which either quick starting or a long life is regarded as important.

It is preferable that the lamp power switching means stores in the memory the rated lamp power as an updated lamp power each time it is discriminated. The selector should assign the updated lamp power as the default one each time the ballast is activated. This makes it possible to automatically set the ballast so as to supply a life-critical ballast output power, which matches with the rated lamp power.

If the rated power of the HID lamp greatly varies as the lamp ages, or if the lamp is replaced with an HID lamp having a very different rated power, it is important that the ballast output be stopped so that the ballast can be protected in such a manner that the ballast output power does not vary beyond a limit.

It is preferable that the lamp power switching means should include a verifying means. The verifying means issues a stop signal when the located rated lamp power is not coincident with any one of the default established ballast output powers. The controller, in response to the stop signal, acts to cease providing the ballast output power. This prevents the occurrence of inadequate outputs other than the default established ballast output power set in the ballast.

When an HID lamp has reached the last stage of its life, it may be driven at the minimum output power, without an excessive output power provided in response to the lamp having reached the last period. This makes it possible to protect the ballast and, at the same time, provide the user with an optical output indicating when to replace the lamp. To this end, the lamp power switching means includes a lamp life monitor, which monitors the lamp output parameter to provide a life-end signal when the HID lamp is determined by the lamp output parameter to come into near end-of-life condition. Receiving the life-end signal, the controller reduces the ballast output power to a minimum.

The acoustic resonance phenomenon exhibited by an HID lamp may be utilized to discriminate the rated power of the lamp. It is recognized that if a metal halide lamp, which is an HID lamp, is lit at a high frequency, it acoustically resonates. The frequency (basic frequency) at which the HID lamp acoustically resonates depends on the shape of the discharge tube of the lamp and/or the pressure of the vapor enclosed in the tube. In general, however, the frequency tends to rise as the rated lamp power decreases. Accordingly, it is possible to discriminate the rated powers of HID lamps on the basis of the difference between the frequencies at which the lamps acoustically resonate. In this case, the lamp power switching means includes a frequency monitor, a memory and a processor. The frequency monitor keeps monitoring the frequency at which the HID lamp gives an acoustic resonance after the HID lamp comes into its stable lamp operating condition. The memory stores the frequency that the HID lamp exhibits after reaching the stable lamp operating condition the frequency is predetermined for each of different combinations of the ballast output power and rated lamp power. The processor references the memory to locate one of the rated lamp power in match with the frequency being monitored, and provides the lamp power signal indicative of the located lamp power. Receiving the lamp power signal, the controller operates to vary the ballast output power in match with the located rated lamp power.

Color temperatures or color (chromaticity) deviations may be used as lamp output parameters for lamp discrimination. An HID lamp exhibits a different color temperature and a different color deviation when it is lit with the ballast output power equal to its rated power than when it is lit with a higher or lower ballast output power. To this end, the lamp power switching means includes a color temperature monitor or a color deviation monitor. The memory stores data on the color temperatures or color deviations that HID lamps having different rated powers exhibit when they are lit with different ballast output powers. The lamp discriminator compares the detected color temperature or color deviation with the data in the memory so as to discriminate the rated power of the HID lamp connected to the ballast. This makes it possible to provide a ballast output power adequate to the rated lamp power.

DETAILED DESCRIPTION OF THE PREFERRED EMBODIMENT

Figure 1:
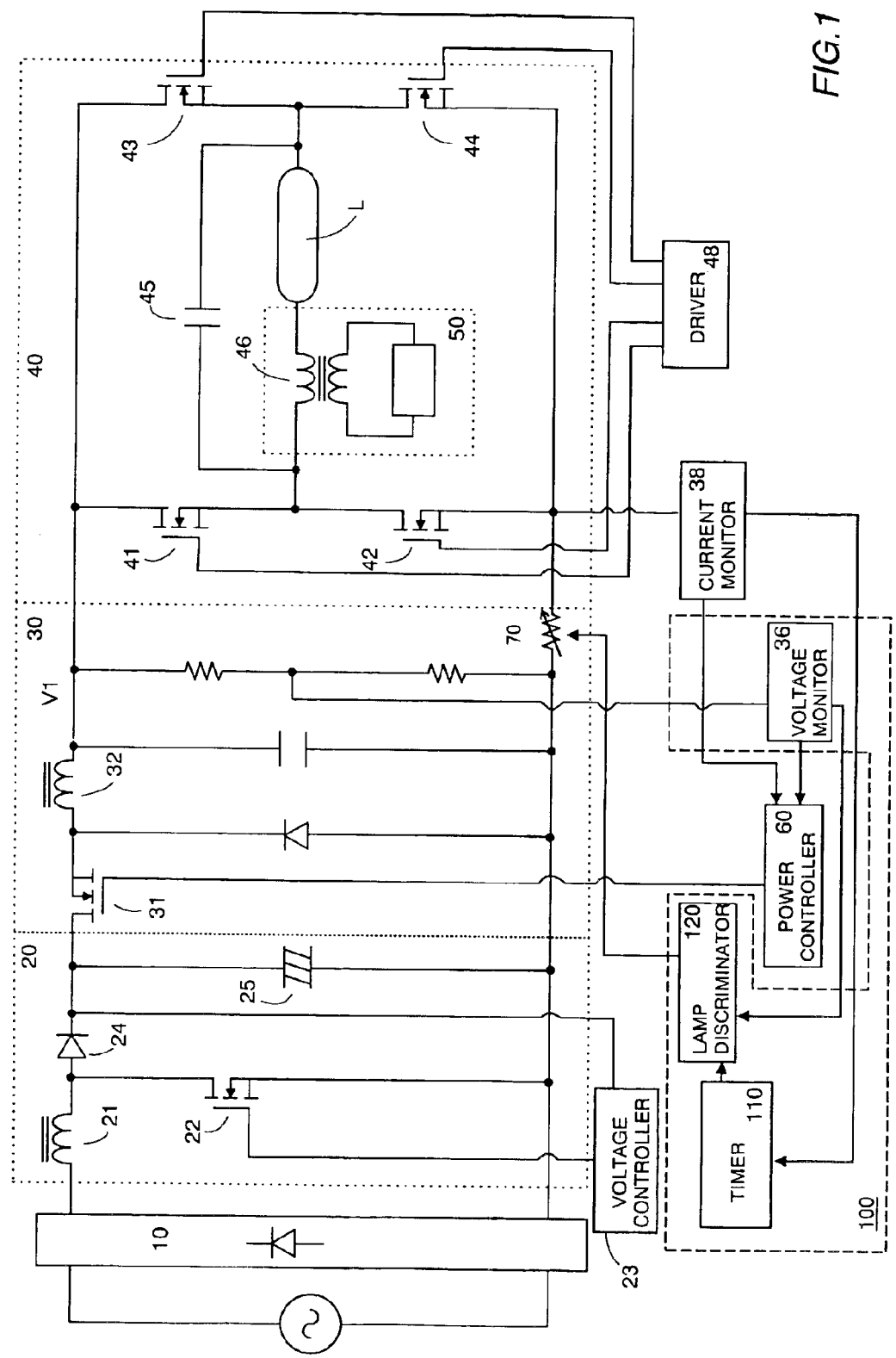
FIG. 1 is a circuit diagram showing an electronic ballast for a high intensity discharge lamp according to a first embodiment of the present invention.

FIG. 1 shows an electronic ballast for a high intensity discharge lamp according to a first embodiment of the present invention, which may be a metal halide lamp. The ballast includes a rectifier 10, a step-up chopper 20, a step-down chopper 30, an inverter 40 and an igniter 50. The rectifier 10 is connected to an AC power supply and provides a rectified DC voltage. The step-up chopper 20 boosts the rectified DC voltage. The step-down chopper 30 decreases the boosted DC voltage and provides a control DC voltage. The inverter 40 converts the control DC voltage into a rectangular-wave AC voltage and applies the AC voltage to the HID lamp L. The igniter 50 ignites the HID lamp L. The step-up chopper 20 includes an inductor 21 and a transistor switch 22, which are connected in series to both ends of the rectifier 10. The transistor switch 22 is a MOSFET, which is turned on or off by a voltage controller 23 at a high frequency and accumulates a smooth voltage through a diode 24 in a smoothing capacitor 25. The voltage controller 23 monitors the voltage across the smoothing capacitor 25 and keeps the output voltage from the step-up chopper 20 constant in a feedback manner.

The step-up chopper 30 includes a transistor switch 31, an inductor 32 and a smoothing capacitor 33, which are connected in series to both ends of the smoothing capacitor 25. The transistor switch 31 is a MOSFET, which is turned on or off by a power controller 60 at a variable duty ratio. The switch 31 supplies a variable voltage and a variable current through the inductor 32 and the smoothing capacitor 33 to the inverter 40. In this sense, the step-up chopper 30 is a power converter that converts the power supplied through the inverter 40 to the HID lamp L. A voltage monitor 36 monitors the voltage across the smoothing capacitor 33 as indicative of the lamp voltage Vla applied to the HID lamp L. A current monitor 38 monitors the current through a resistor 70 as indicative of the lamp current Ila through the HID lamp L. The power controller 60 detects the lamp voltage Vla and the lamp current Ila, and operates to provide a predetermined ballast output power to the HID lamp L so as to light the lamp and keep it lit.

The inverter 40 includes a pair of transistor switches 41 and 42 and a pair of transistor switches 43 and 44. The pairs of transistor switches 41–44 are connected in parallel with each other pair and in series to both ends of the smoothing capacitor 33. The inverter 40 also includes a capacitor 45, which is connected to both ends of the HID lamp L and an inductor 46. The inductor 46 is connected in series to the HID lamp L between the node between the transistor switches 41 and 42 and the node between the transistor switches 43 and 44. A driver 48 repeatedly turns on and off the transistor switches 41–44 to provide an AC current. The transistor switches 41–44 supply the AC current as the lamp current Ila to the HID lamp L.

The ballast includes a lamp power switching means 100. The lamp power switching means 100 discriminates the rated power of the HID lamp L connected to the ballast and controls the power controller 60 so that the ballast can output a power according to the rated power. The lamp power switching means 100 includes a voltage monitor 36, a timer 110 and a lamp discriminator 120. The lamp power switching means 100 discriminates the rated power of the HID lamp L by analyzing the lamp voltage Vla at a point T1 when a predetermined time has passed after the lamp has just started operating bet before it reaches its stable lamp operating condition.

Figure 2:
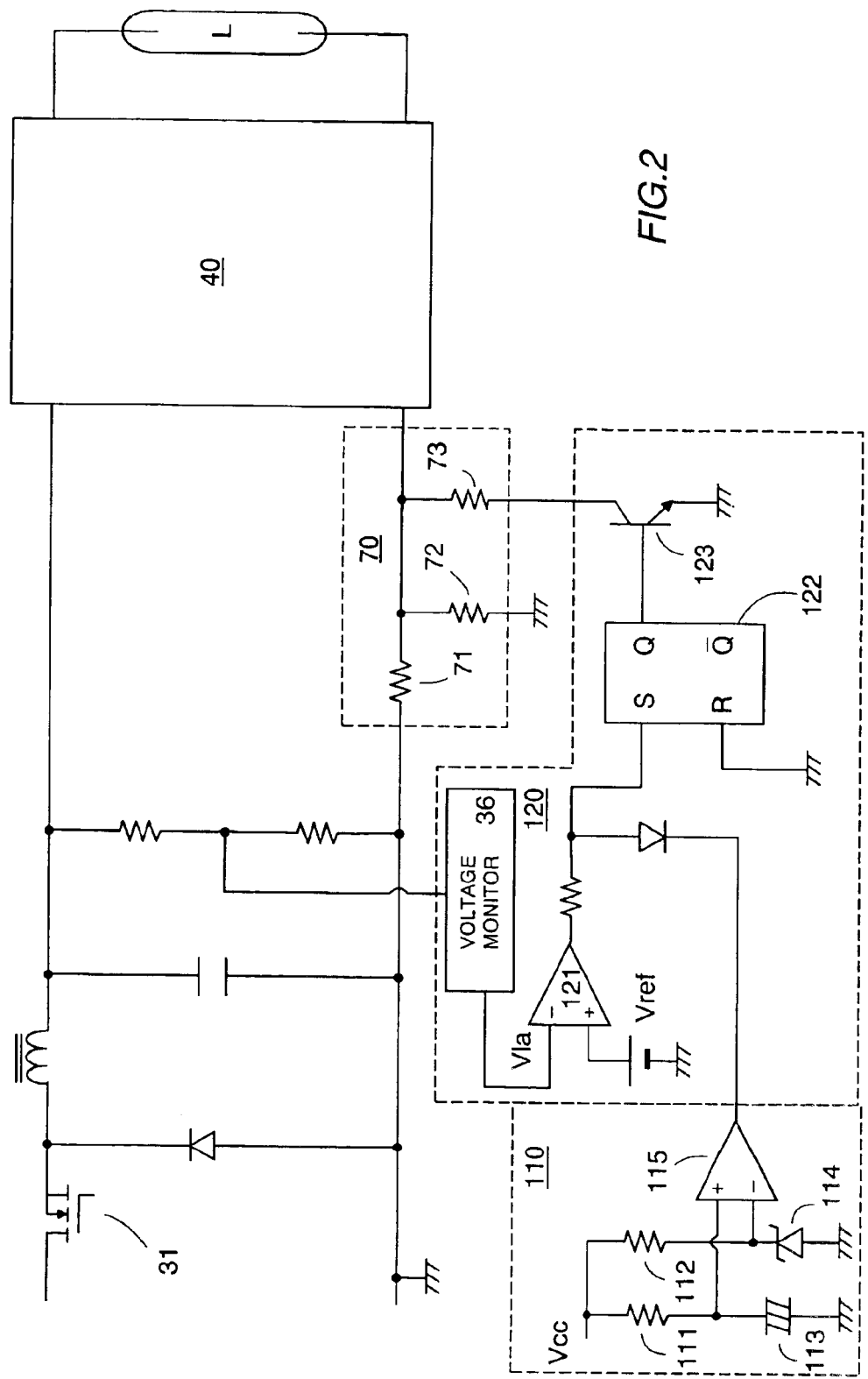
FIG. 2 is a circuit diagram showing the lamp power switching means of this ballast.

The ballast is so designed as to switch the ballast output power between a first value and a second value, which may be 70 W and 150 W respectively. In initialized condition, the ballast outputs 70 W. Specifically, the resister 70 is variable, which is used in order that the power controller 60, which controls the ballast output power, detects the lamp current Ila. With the variable resistor 70 switched between two values of resistance, the detected lamp current Ila is changed. The power controller 60 switches the ballast output power between 70 W and 150 W according to the detected lamp current Ila. As shown in FIG. 2, the variable resistor 70 includes two resistors 71 and 72, where the lamp current Ila always flows, and a resister 73, where current selectively flows. When the lamp current Ila flows only through the resistors 71 and 72, the power controller 60 so operates that the ballast outputs the power of 70 W. When current flows through the resistor 73 also, the power controller 60 so operates that the ballast outputs the power of 150 W.

As shown in FIG. 2, the timer 110 includes two resistors 111 and 112, a capacitor 113, a Zener diode 114 and a comparator 115. The capacitor 113 is charged by the voltage Vcc provided when the HID lamp L starts operating. At the predetermined point T1, when the threshold value of the Zener diode 114 is exceeded, the output from the comparator 115 changes to a high level.

The lamp discriminator 120 includes a comparator 121, which compares the lamp voltage Vla from the voltage monitor 36 with a predetermined reference value Vref. At the point when the timer 110 outputs a high level signal indicating that the predetermined time has passed, a predetermined criterion (Vla<Vref) is satisfied if the lamp voltage Vla is lower than the reference value Vref. This causes the comparator 121 to output a high level signal, which sets an RS flip-flop 122. An output Q from the RS flip-flop 122 turns on a transistor 123, making the resistor 73 conductive so that the lamp current Ila changes. Consequently, the power controller 60 operates to change the ballast output power from 70 W to 150 W.

Figure 4:
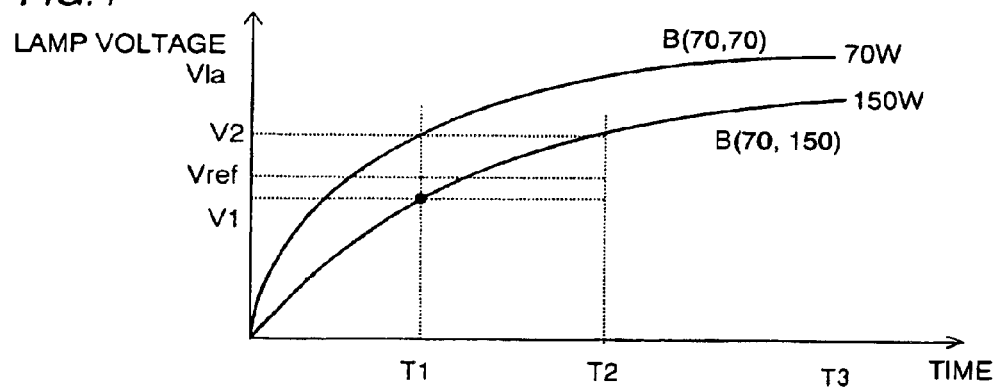
FIG. 4 is a graphic chart showing starting characteristics of HID lamps having different rated powers.
Figure 5:
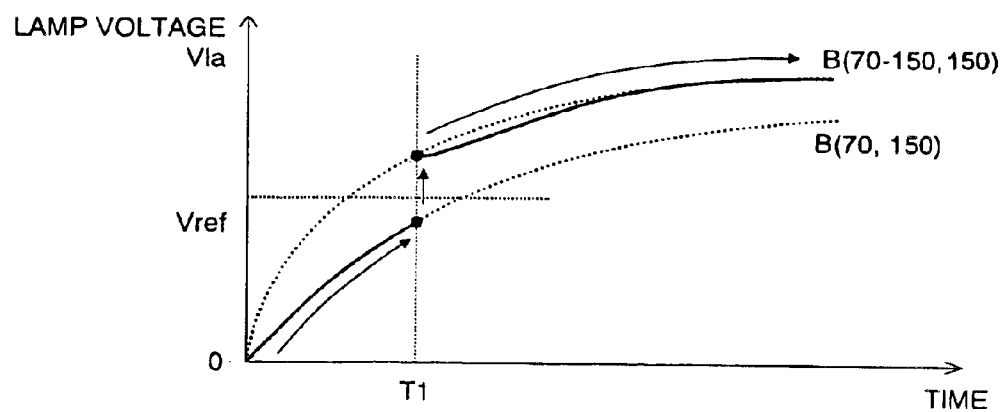
FIG. 5 is a graphic chart showing the operation of the ballast.

The operation of the foregoing will be described with reference to FIGS. 4 and 5. As stated above, the ballast outputs a power of 70 W in its initialized condition. If the ballast is connected to an HID lamp having a rated power of 150 W, as shown in FIGS. 4 and 5, it is detected that the lamp voltage Vla rises along a curve B (70, 150) and is lower than the reference value Vref at the time T1 after the time when the lamp starts discharging, so that the criterion (Vla<Vref) is satisfied. This switches the resistance of the variable resistor 70, thereby changing the detected value of lamp current Ila for power control. Consequently, the power controller 60 switches the ballast output power from 70 W to 150 W, so that the lamp voltage Vla rises as shown by the arrow in FIG. 5. Thereafter, the lamp voltage Vla keeps increasing along a curve (70–150, 150) until the stable lamp operating condition is reached. After a point immediately after the time T1, when the ballast output power is switched from 70 W to 150 W, the lamp voltage Vla exceeds the reference value Vref (Vla>=Vref), so that the criterion (Vla<Vref) is not satisfied. After this point, however, because the output from the flip-flop 122 is latched at a high level, the ballast output power is fixed at 150 W.

Figure 6:
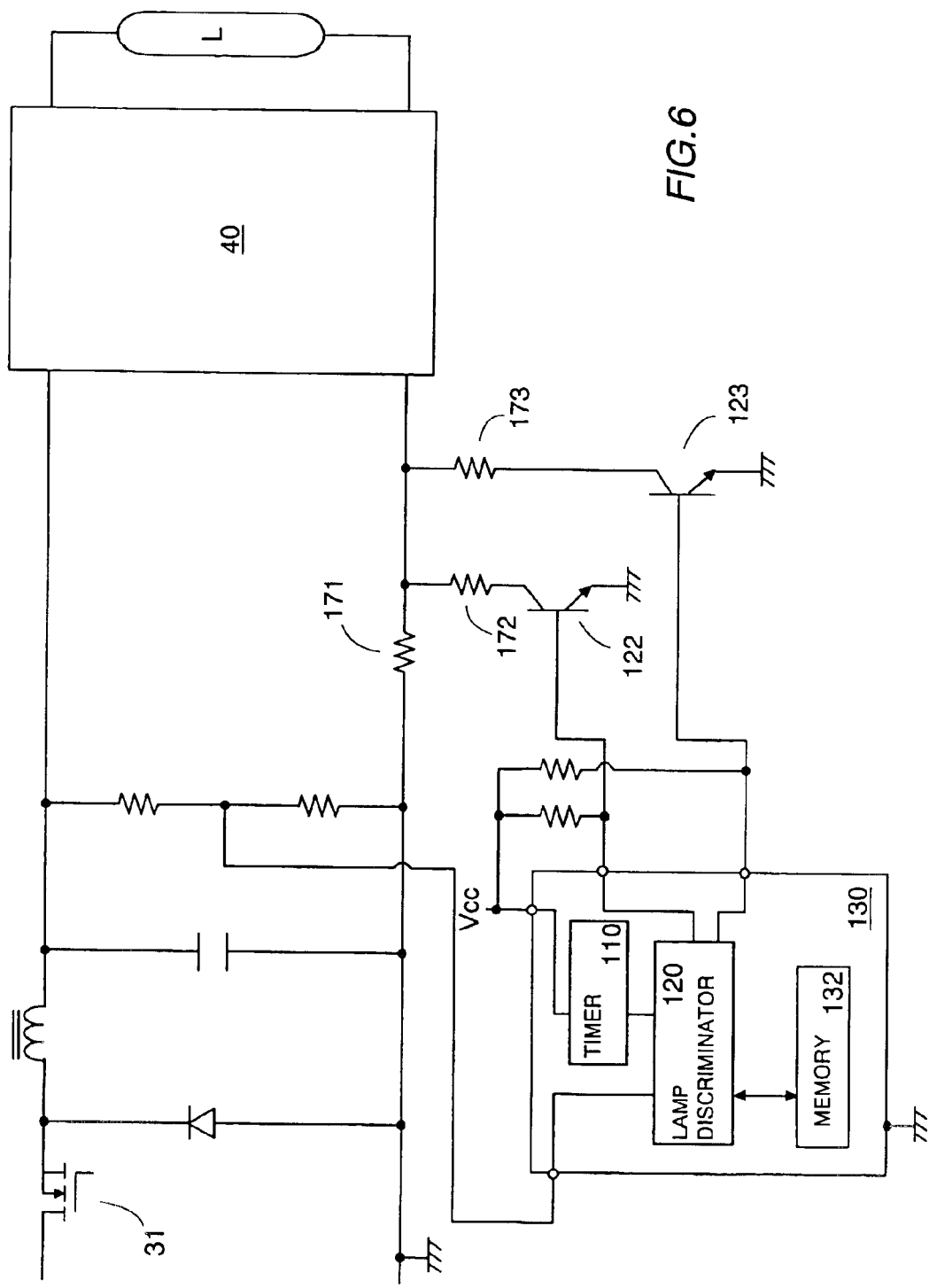
FIG. 6 is a circuit diagram showing an electronic ballast for a high intensity discharge lamp according to a second embodiment of the present invention.

FIG. 6 shows a second embodiment of the present invention, in which the timer 110 and the lamp discriminator 120 are realized by a microprocessor 130. The first and second embodiments are the same except for the lamp discriminator 120 and the structure of variable resistor 70 that is associated with the discriminator. The similar circuit elements of these embodiments are assigned the same numerals.

The microprocessor 130 includes a memory 132, which stores data, as shown below in Table 1, on the lamp voltages Vla detected if two ballast output voltages of 70 W and 150 W are applied to HID lamps L having rated powers of 70 W and 150 W.

TABLE 1

| Ballast output power | Rated lamp power | Detected lamp voltage |
|---|---|---|
| 70 W | 70 W | V3 |
| 70 W | 150 W | V2 (<V3) |
| 150 W | 70 W | V1 (>V3) |
| 150 W | 150 W | V3 |

At the time T1, which is determined from the output from the timer 110, the lamp discriminator 120 takes in the lamp voltage Vla, refers to the data in the memory 132 and locates the rated lamp power associated with the detected lamp voltage Vla. If the located rated lamp power differs from the ballast output power, the power controller 60 is so controlled as to switch the ballast output power so that the ballast can output the power equal to the rated lamp power.

The variable resistor 70 includes a series circuit including a resistor 172 and a transistor switch 122, and a series circuit including a resistor 173 and a transistor switch 123. These series circuits are connected in parallel with each other to the ground. The variable resistor 70 is so set that the output from the lamp discriminator 120 can make one of the resistors conductive. When the resistor 172 is conductive, the ballast output power of 70 W is selected. When the resistor 173 is conductive, the ballast output power of 150 W is selected. The output from the lamp discriminator 120 makes the transistor 123 normally on so that the ballast supplies the ballast output power of 150 W as a predefined value. Under this condition, if an HID lamp having a rated power of 70 W is connected, the lamp discriminator 120 discriminates the ballast output power of 70 W and outputs signals that turn off the transistor 123 and turn on the transistor 122 at the same time to make the resistor 172 conductive. This switches the ballast output power from 150 W to 70 W. If the rated lamp power equal to the ballast output power is located, the lamp discriminator 120 outputs no power signal for power switching, so that the initial ballast output power is maintained.

The memory 132 might, instead of storing the data shown in FIG. 1, store only the reference value Vref so that the HID lamp L could be discriminated by comparing the detected lamp voltage Vla with the reference value Vref. In this case, the detected lamp voltage Vla and the rated lamp voltage Vref are compared, and the ballast output power is changed once or more times step by step in such a manner that the difference between the voltages disappears, so that the rated lamp power and the ballast output power are eventually equal to each other. The direction in which the ballast output power is changed may depend on whether the value Vla−Vref (left by the reference value Vref subtracted from the lamp voltage Vla) is positive or negative. In this case, the ballast output power is increased if the value Vla−Vref is negative, and the power is decreased if the value is positive. In any case, if the detected lamp voltage Vla does not satisfy a predetermined relationship (Vla=Vref) between itself and the reference value Vref, the ballast output voltage is changed in such a manner that this relationship is satisfied, so that the ballast output voltage adequate to the rated power of the HID lamp L can be automatically selected.

When a predetermined time has passed after the lamp discriminator 120 discriminates the HID lamp L once after the lamp starts discharging, the discriminator may discriminate the lamp at least one more time. In this case, when the predetermined time has passed after the first discrimination, the timer 110 provides another enabling signal. In response to this enabling signal, the lamp discriminator 120 discriminates the HID lamp L by comparing the lamp voltage Vla with another reference value Vref. The rated lamp power resulting from the newest discrimination is stored in the memory 132, so that the previous rated lamp power is updated as the initial set value that designates the ballast output voltage for lighting another HID lamp.

Figure 7:
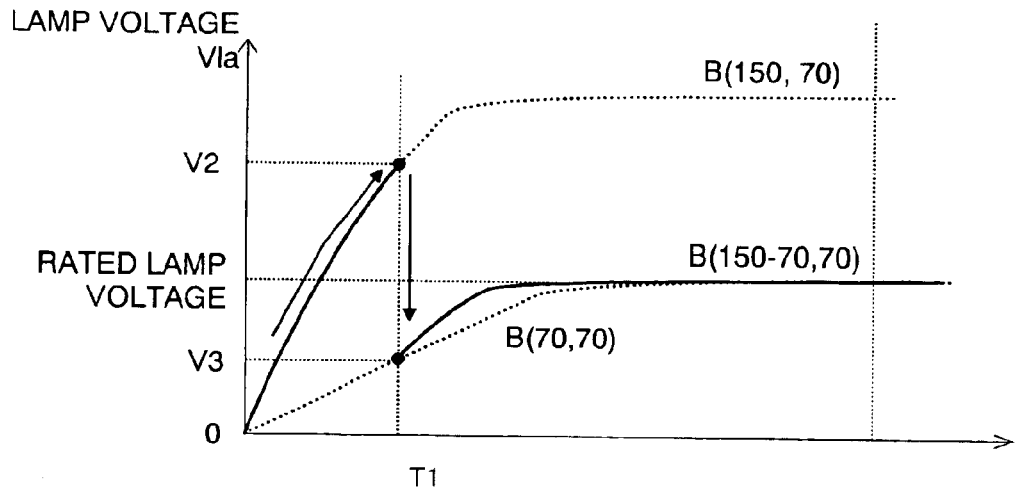
FIGS. 7 and 8 are graphic charts showing the operation of this ballast.
Figure 8:
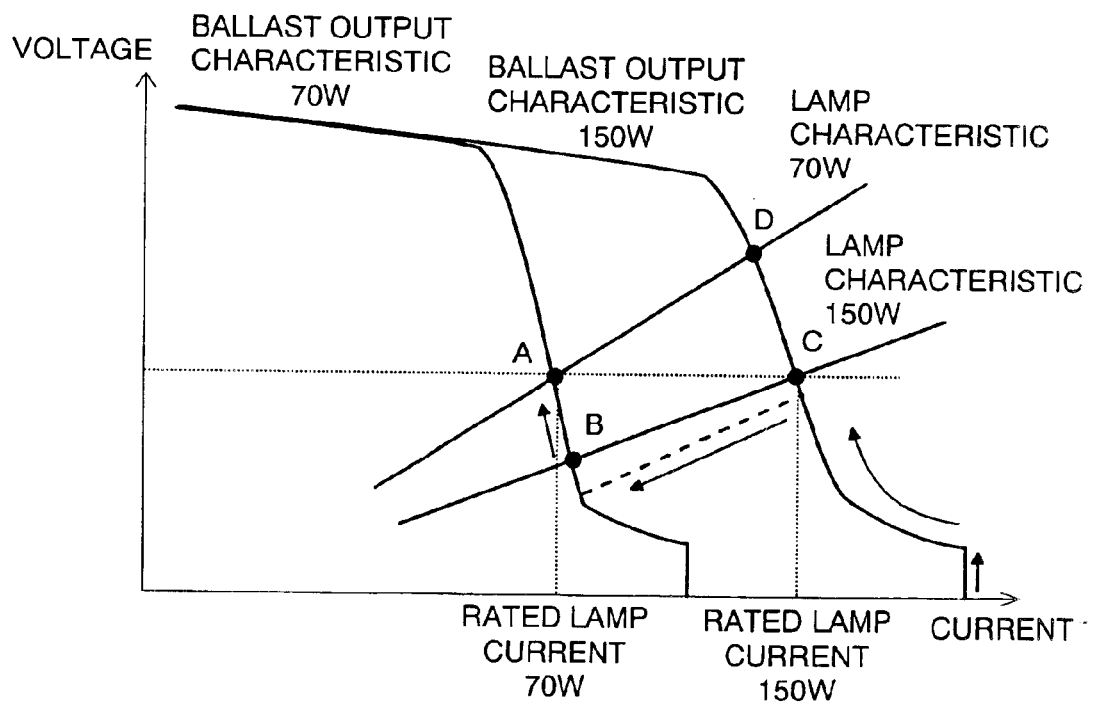

FIGS. 7 and 8 show the operation of the ballast outputting a power of 150 W and connected with an HID lamp having a rated power of 70 W. In FIG. 7, a curve B (150, 70) represents the variation of the lamp voltage Vla of the HID lamp. The voltage Vla is V2 (Vla=V2) at the point T1 after the time when the HID lamp starts discharging. If this lamp is lit at a ballast output power of 70 W, the lamp voltage Vla is V3 (Vla=V3) at the point T1. The lamp voltage V2 is higher than the lamp voltage V3 (V2>V3), and accordingly the rated lamp power for the lamp voltage V2 is discriminated. In this case, the discriminated lamp power is 70 W. Consequently, the ballast output power is switched from 150 W to 70 W and thereafter controlled along a curve B (150–70, 70). With reference to FIG. 8, the HID lamp L is first supplied with power toward the node D where the characteristic curve of the ballast output power of 150 W and the lamp characteristic of the rated lamp power of 70 W cross each other. At the point T1, it is determined that the rated lamp power is 70 W, so that the ballast output power is switched from 150 W to 70 W, and the operating point shifts along the course or route represented by a dotted line in FIG. 8, and through point B to point A.

Figure 3:
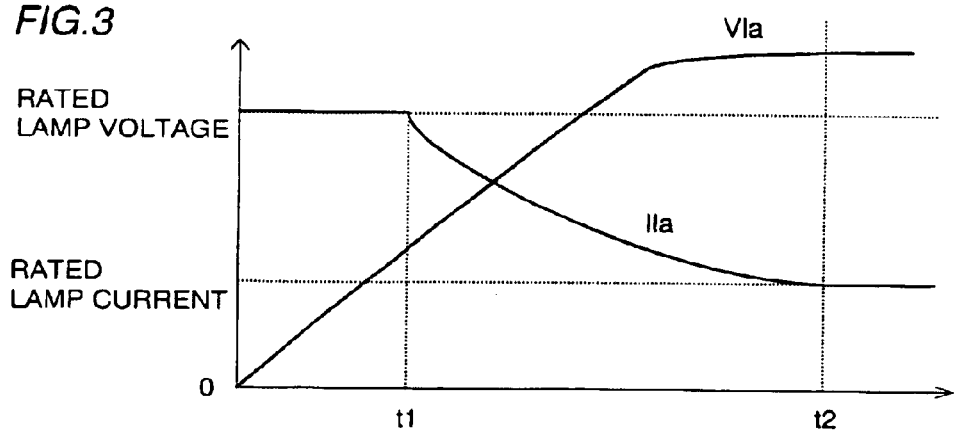
FIG. 3 is a graphic chart showing output characteristics that the HID lamp exhibits after it starts operating.

By monitoring the lamp voltage Vla and/or the lamp current Ila, as shown in FIG. 3, it can be determined whether the HID lamp L has started discharging. Accordingly, a means may be used to determine whether the HID lamp has started discharging by determining whether the lamp voltage Vla or the lamp current Ila has exceeded a predetermined value. After it is detected by this means that the lamp has started discharging, the lamp discriminator 120 might discriminate the rated lamp power on the basis of the lamp voltage Vla.

Figure 9:
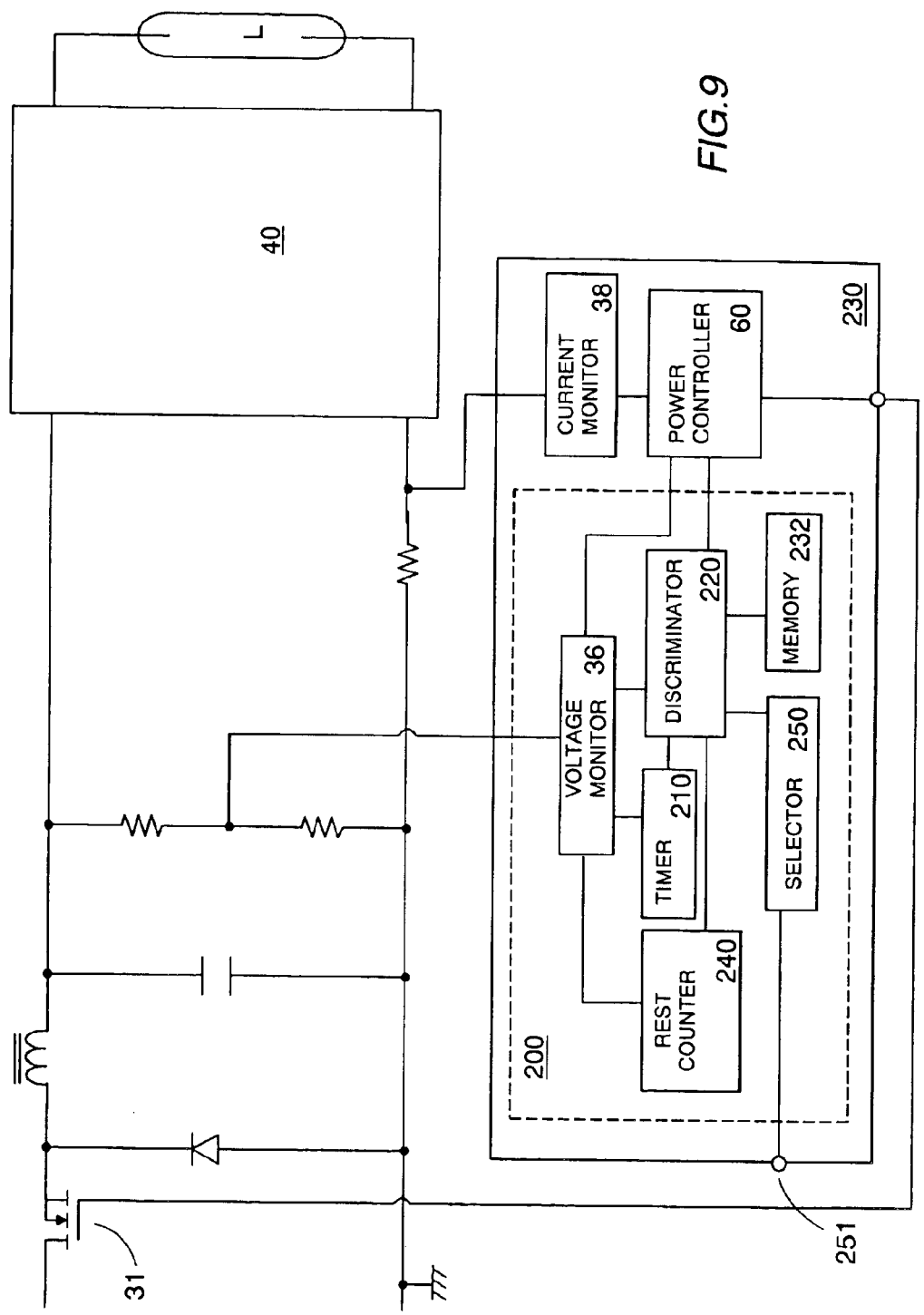
FIG. 9 is a circuit diagram showing an electronic ballast for a high intensity discharge lamp according to a third embodiment of the present invention.

FIG. 9 shows a ballast for a high intensity discharge lamp according to a third embodiment of the present invention. This ballast includes a microprocessor 230, into which the current monitor 38, the voltage monitor 36 and the power controller 60 are incorporated in addition to a lamp power switching means 200. Immediately after starting, the power controller 60 supplies the HID lamp L with a constant current to reliably start it discharging (ignite it). Thereafter, while the power controller 60 is monitoring the lamp current Ila and the lamp voltage Vla, it supplies the HID lamp L with a constant power so that the lamp changes to its stable lamp operating condition. Even thereafter, the power controller 60 maintains a constant ballast output power. The other components of this embodiment are identical with the counterparts of the first embodiment.

The lamp power switching means 200 includes a timer 210, a discriminator 220 and a memory 232. After HID lamps having different rated powers start discharging, it takes their lamp voltages Vla different lengths of time to reach a predetermined value V2. The ballast is so designed as to take advantage of this phenomenon to discriminate the rated powers of the HID lamps. Specifically, as shown in FIG. 4, an HID lamp having a rated power of 150 W and an HID lamp having a rated power of 70 W may be connected to a ballast that outputs a power of 70 W. In this case, it takes the lamp voltages Vla of these lamps different lengths of time T1 and T2 to reach the predetermined value V2. The rated lamp powers are discriminated on the basis of the different lengths of time T1 and T2. To this end, the timer 210 starts counting when the HID lamp L connected to the ballast starts discharging. When the lamp voltage Vla of the HID lamp L exceeds the predetermined value V2 in the voltage monitor 36, the timer 210 stops counting and provides the discriminator 220 with the time accumulated after the timer starts counting and until it stops counting. The memory 232 stores data representing the accumulated time periods peculiar to the cases where HID lamps having rated lamp powers of 70 W and 150 W are connected to the ballast that outputs two powers of 70 W and 150 W. The discriminator 220 refers to this table and determines the rated power of an HID lamp L from the time accumulated by the timer 210. The discriminator 220 then outputs to the power controller 60 a power signal indicative of the determined lamp power. In response to the power signal, the power controller 60 changes the ballast output power so as to equalize it with the determined lamp power. In this embodiment also, the ballast is so initialized as to output a first power or a second power (for example, 70 W). If the discriminator 220 detects a rated lamp power different from the ballast output power, it outputs a power signal commanding that the output power be switched.

The lamp power switching means 200 further includes a rest counter 240, which measures the time from the last extinction till relighting and compensates the time accumulated by the timer 210. The accumulated time period is so compensated that, in consideration of a rapid rise in lamp voltage as seen when the lamp voltage rises during the short time from extinction till relighting, it is possible to accurately discriminate the lamp output when the HID lamp L is relighted. As the time till relighting shortens, the time accumulated until the lamp voltage Vla reaches the predetermined value V2 shortens. Therefore, the discriminator 220 so operates as to compensate the accumulated time period. The relationship between the time till relighting and the time accumulated until the lamp voltage Vla reaches the predetermined value V2 is measured in advance and stored in the memory 232. The discriminator 220 recognizes the time sent from the rest counter 240. If this accumulated time period is short, the discriminator 220 corrects it so as to accurately discriminate the lamp power.

Another method for determining the rated lamp power involves comparing the accumulated time period with a predetermined reference time. If the accumulated time period is longer (shorter) than the reference time, it is determined that the present ballast output power differs from the rated power of the connected lamp. Consequently, the ballast output power is changed in such a direction that the accumulated time period becomes shorter (longer) than the reference time. Under this method, it is possible to compensate the determination at the time of relighting by changing the reference time. If the 150 W lamp is relit at the ballast output power of 70 W, as shown in FIG. 4, the length of time T2 (accumulated time period), which takes the lamp voltage to reach the predetermined value V2, shortens. The HID lamp is discriminated accurately by correcting the reference time for comparison with the length of time T2 so as to shorten the reference time. Of course, the present invention is not limited to such a specific method, but the accumulated time period itself might be corrected.

The ballast includes a selector 250 for optionally selecting an initial set value of ballast output power. The selector 250 has an input terminal 251 for receiving a signal from an external device, which may be a remote controller, so that the initial set value is switched to either 70 W or 150 W. The value selected by the selector 250 is recognized by the lamp discriminator 220 and then stored in the memory 232. If the initial set value of ballast output power is large, the lamp life shortens because a great stress is imposed on the HID lamp before the lamp is discriminated. If the initial set value is the minimum ballast output power, as is the case with this embodiment, the lamp life can be lengthened. In general, the optical output of a new HID lamp rises slowly. However, if the maximum ballast output power is selected as the initial set value by means of the selector 250, the rise delay of the optical output can be eliminated, so that quick lighting can be realized. If quick lighting is regarded as more important than the lamp life, the maximum ballast output power can be selected as the initial set value by means of the selector 250. If the lamp life is regarded as more important than quick lighting, the minimum ballast output power can be selected as the initial set value by means of the selector 250.

In a modification of this embodiment, the memory 232 might store the ballast outputs for the rated lamp powers discriminated by the lamp discriminator 220, and another HID lamp might be supplied with the ballast output power for the rated lamp power discriminated for the lamp. In this case, until the HID lamp L is replaced with a lamp having a different rated power, it would be possible to keep lamps lit under optimum conditions.

The rest counter 240 could be used equally in the foregoing embodiment(s).

The lamp discriminator 220 may discriminate the HID lamp L at least one more time when a predetermined time has passed after the lamp is discriminated once after it starts discharging. In this case, the timer 210 provides another enabling signal when the predetermined time has passed after the HID lamp L is discriminated once. In response to this enabling signal, the lamp discriminator 220 discriminates the HID lamp L by comparing the accumulated time period with reference times other than the foregoing reference time. The memory 232 stores the last discriminated lamp power, which is updated as the initial set value that designates the ballast output voltage for lighting another HID lamp.

The method for discriminating the rated power of an HID lamp on the basis of the time it takes the lamp voltage Vla of the lamp to reach a predetermined value could replace the method of discrimination in the embodiment shown in FIG. 6.

Figure 10:
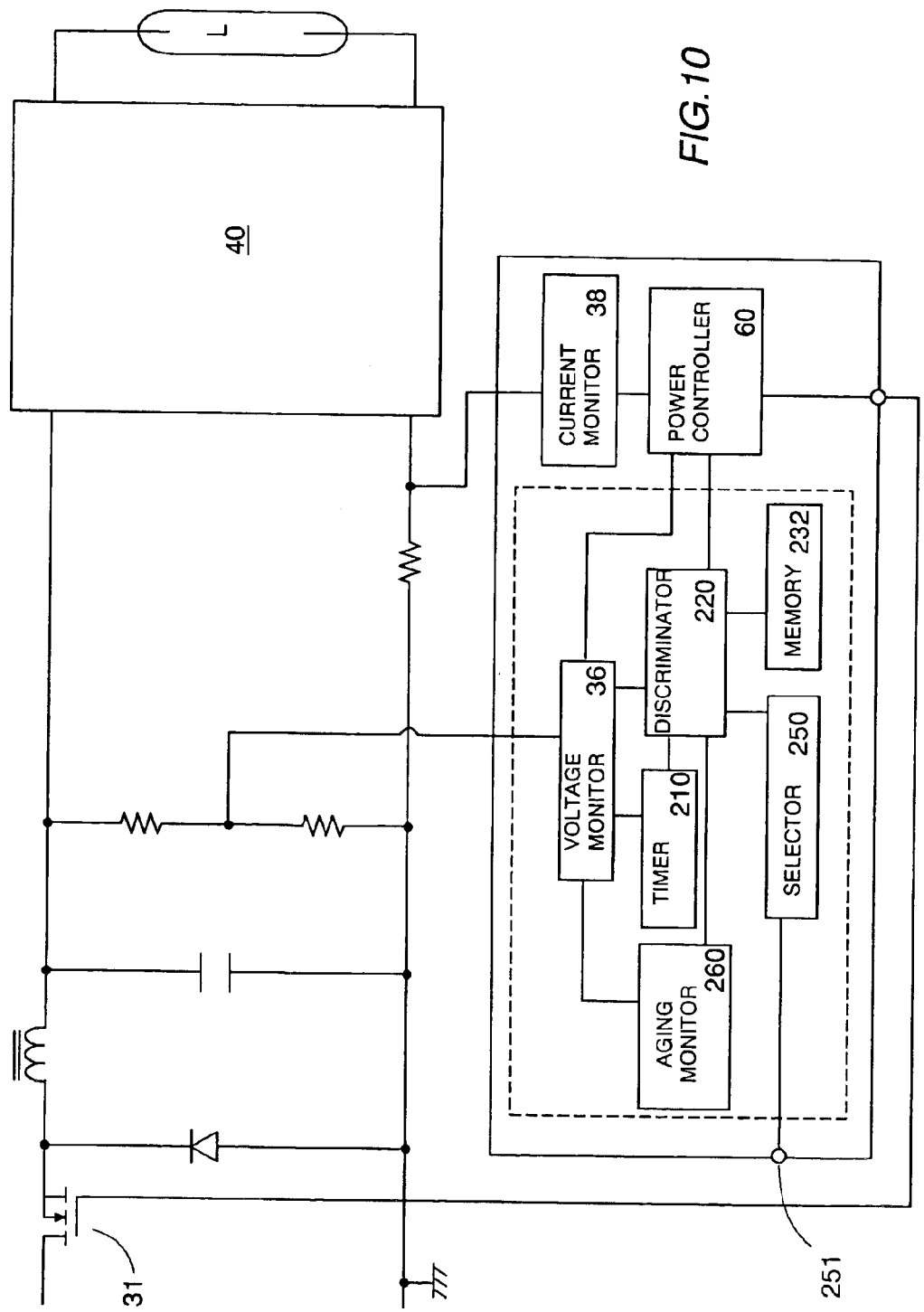
FIG. 10 is a circuit diagram showing an electronic ballast for a high intensity discharge lamp according to a fourth embodiment of the present invention.

FIG. 10 shows a ballast for a high intensity discharge lamp according to a fourth embodiment of the present invention. This embodiment is identical with the embodiment shown in FIG. 9 except that, in this embodiment, the lamp power switching means 200 includes an aging monitor 260 in place of the rest counter. The aging monitor 260 monitors the lamp voltage Vla of the HID lamp to monitor the variation of a lamp characteristic of the lamp with the lamp aging. As an HID lamp is used for a long time, its lamp voltage Vla tends to rise. This embodiment makes it possible to accurately discriminate the rated power of an HID lamp even if the lamp voltage Vla of the lamp varies as the lamp is used for a long time. The aging monitor 260 sends the lamp discriminator 220 a signal indicative of the cumulative using time of the HID lamp L. On the basis of the cumulative using time, the lamp discriminator 220 corrects the accumulated time period and/or the reference time. With regard to the amount of correction, the memory 232 stores the relationships between the cumulative using time and the accumulated time period and/or the reference time in advance. Referring to this data, the lamp discriminator 220 discriminates the rated lamp power.

The aging monitor 260 could be used equally in the foregoing embodiment(s).

Figure 11:
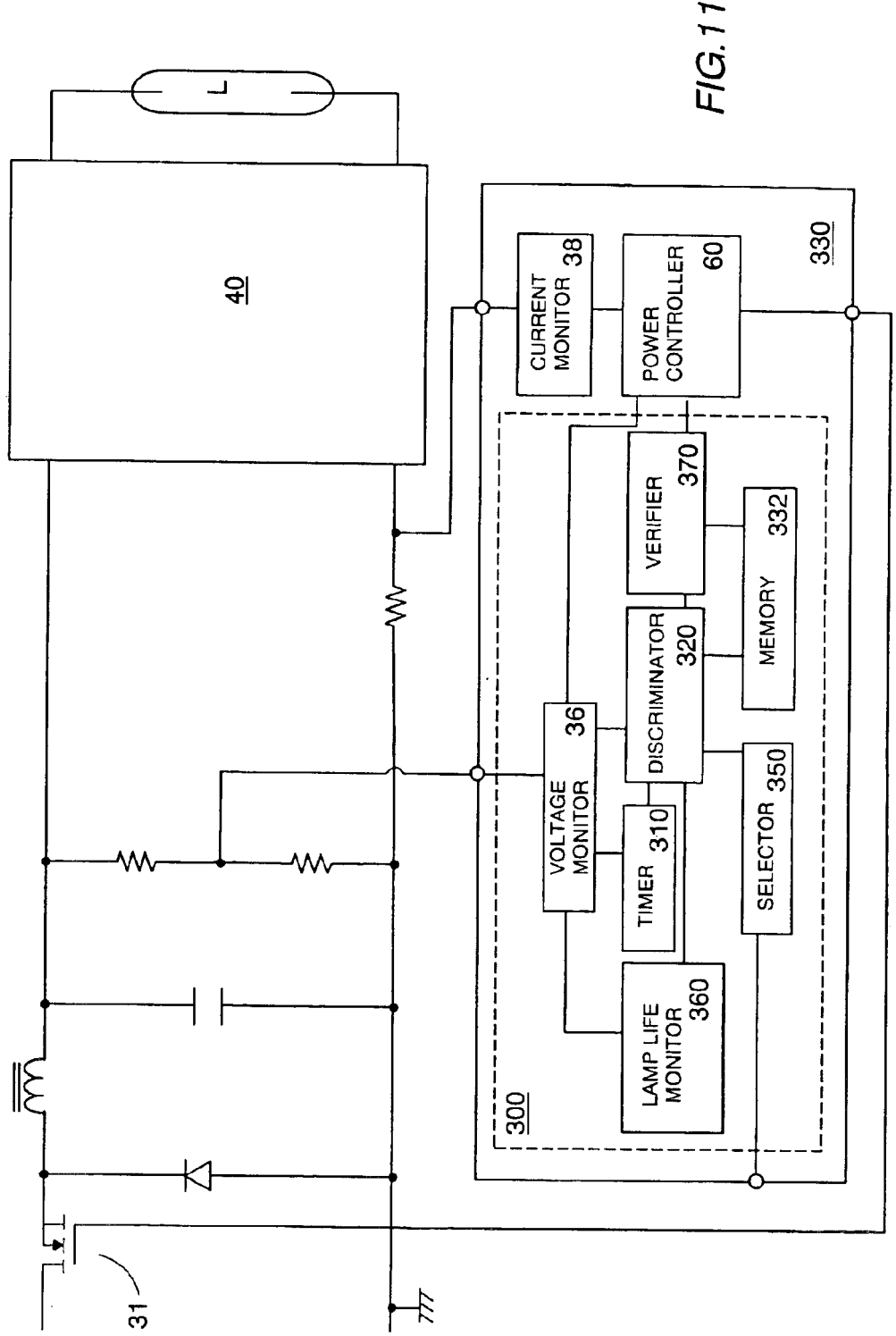
FIG. 11 is a circuit diagram showing an electronic ballast for a high intensity discharge lamp according to a fifth embodiment of the present invention.

FIG. 11 shows a ballast for a high intensity discharge lamp according to a fifth embodiment of the present invention. As is the case with the embodiment shown in FIG. 10, this ballast includes a microprocessor 330, into which the current monitor 38, the voltage monitor 36 and the power controller 60 are incorporated in addition to a lamp power switching means 300. The lamp power switching means 300 differs from the counterpart(s) of the foregoing embodiment(s) in discriminating the lamp power on the basis of the lamp voltage Vla exhibited after the HID lamp L reaches its stable lamp operating condition. In general, even if HID lamps have different rated powers, they exhibit nearly equal rated voltages when they are lit stably at their respective rated powers. However, if the rated power of each of the HID lamps differs from the ballast output power, as is the case before the lamp is stably lit, the lamp voltage Vla differs from the rated lamp voltage even after the lamp is lit stably. This embodiment takes advantage of this phenomenon to discriminate the rated power of an HID lamp L after the lamp is lit stably.

At the same time that the HID lamp L starts discharging, the timer 310 starts counting the time it takes the lamp to be presumed to have reached a point after the point when it is lit stably. At the counted time, the lamp voltage Vla detected by the voltage monitor 36 is sent to the lamp discriminator 320. The memory 332 stores in advance the lamp voltages Vla that HID lamps having different rated powers and supplied with different ballast output powers exhibit when they have reached their stable lamp operating conditions. As shown below in Table 2, the memory 332 may store the lamp voltages that HID lamps L having rated powers of 70 W and 150 W exhibit if they are lit at ballast output powers of 70 W and 150 W.

TABLE 2

| Ballast output power | Rated lamp power | Detected lamp voltage |
|---|---|---|
| 70 W | 70 W | 71 V |
| 70 W | 150 W | 86 V |
| 150 W | 70 W | 107 V |
| 150 W | 150 W | 91 V |

Accordingly, by referring to the data in the memory 332 and analyzing the lamp voltage Vla detected by the voltage monitor 36, it is possible to discriminate the rated power of the presently connected HID lamp L.

Figure 12:
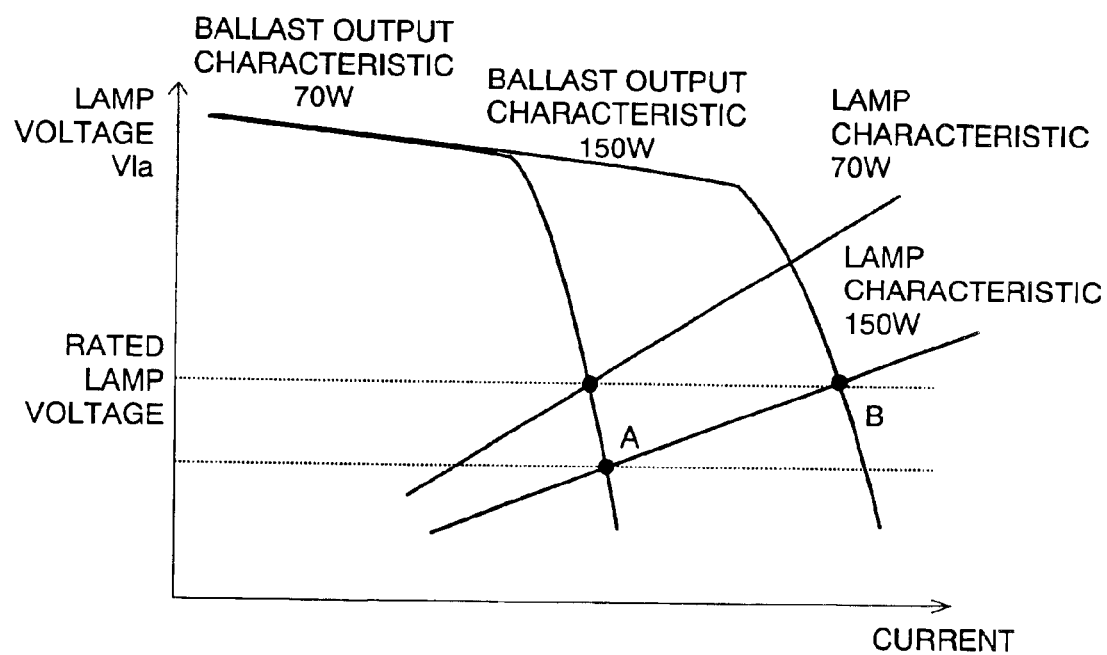
FIG. 12 is a current-voltage characteristic graph showing the operation of this ballast in a stable lamp operating condition.

FIG. 12 shows-the relationship between the characteristic of the ballast output power and the characteristic of the rated lamp power at points when the lamps have reached their stable lamp operating conditions. If an HID lamp L having a rated power of 150 W is lit at the ballast output power of 150 W, it is stable with the current and voltage at an operating point B. If this lamp is lit at the ballast output power of 70 W, it is stable with the current and voltage at an operating point A different from the original operating point B. However, the original operating point B can be obtained because the ballast output power is switched from 70 W to 150 W for the foregoing reason.

In the foregoing description, for easy understanding of the operation, the ballast output powers and the rated lamp powers are two values of 70 W and 150 W. However, it is possible to discriminate three or more HID lamps having different rated powers and automatically select ballast output powers for them. In this case, as stated above, the memory 332 stores data on the lamp voltages that three or more HID lamps having different rated powers exhibit if they are lit at the three or more corresponding ballast output powers. The comparison of the detected lamp voltage Vla with the data makes it possible to discriminate the rated power of the presently connected HID lamp L.

HID lamps L having different rated powers can be discriminated even if the memory 332 stores only rated lamp voltage so that the amount of data in the memory can be a minimum. In this case, a rated lamp voltage common to the HID lamps L is stored as a reference value Vref in the memory 332. The lamp discriminator 320 compares the detected lamp voltage Vla and the reference value (rated lamp voltage Vref). The ballast output power is changed once or more times step by step in such a manner that the difference between the detected and reference voltages disappears, so that the rated lamp power and the ballast output power are eventually equal to each other. The direction in which the ballast output power is changed may depend on whether the value Vla-Vref (left by the reference value Vref subtracted from the lamp voltage Vla) is positive or negative. In this case, the ballast output power is increased if the value Vla-Vref is negative, and the power is decreased if the value is positive. In any case, if the detected lamp voltage Vla does not satisfy a predetermined relationship (Vla=Vref) between itself and the reference value Vref, the ballast output voltage is changed in such a manner that this relationship is satisfied, so that the ballast output voltage adequate for the rated power of the HID lamp L can be automatically selected.

The lamp power switching means 300 includes a lamp life monitor 360 for determining whether the HID lamp L approaches the end of its life. When an HID lamp L approaches the end of its life, its lamp voltage Vla rises greatly. By monitoring the lamp voltage Vla, it is possible to estimate the life of the HID lamp. Specifically, if the lamp voltage Vla exceeds a predetermined value, the lamp life monitor 360 provides the discriminator 320 with a signal indicating that the HID lamp is in the last stage of its life. In response to this signal, the discriminator 320 commands the power controller 60 to minimize the ballast output power. This prevents the ballast from generating an excessive voltage and suppresses the optical output so that the user can recognize the need to replace the HID lamp.

When a predetermined time has passed after the lamp discriminator 320 discriminates the HID lamp L once after the lamp starts discharging, the discriminator may discriminate the lamp at least one more time. In this case, when the predetermined time has passed after the first discrimination, the timer 310 provides another enabling signal. In response to this signal, the lamp discriminator 320 discriminates the HID lamp L on the basis of the lamp voltage. The rated lamp power resulting from the newest discrimination is stored in the memory 332, so that the previous rated lamp power is updated as the initial set value that designates the ballast output voltage for lighting another HID lamp.

The lamp power switching means 300 includes a verifier 370. If the rated lamp power discriminated by the lamp discriminator 320 differs from the predefined value stored in the memory 332, the verifier 370 sends a stop signal to the power controller 60 to stop the ballast. This configuration can protect the ballast and/or the HID lamp by preventing the ballast from generating impertinent or irrelevant outputs if the lamp discriminator 320 discriminates the rated lamp power different from the adaptable output power set in the ballast. The memory 332 stores two or more default established ballast output powers. When the verifier 370 determines that the detected rated lamp power differs from all of the predefined powers, a stop signal is sent to the power controller 60 so as to stop the output from the power converter 30.

Figure 13:
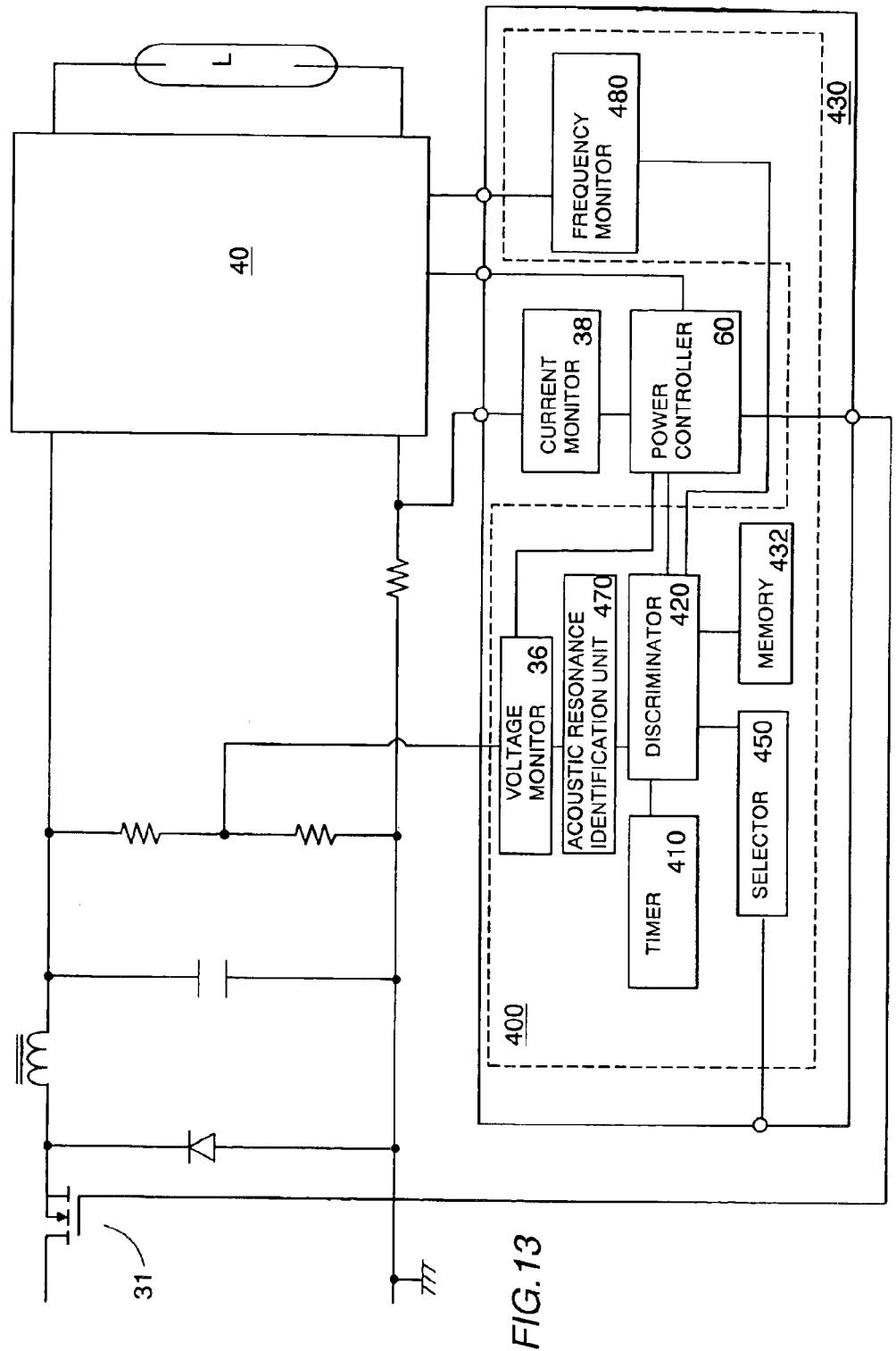
FIG. 13 is a circuit diagram showing an electronic ballast for a high intensity discharge lamp according to a sixth embodiment of the present invention.

FIG. 13 shows a ballast for a high intensity discharge lamp according to a sixth embodiment of the present invention. This embodiment bases the discrimination of lamp power on the acoustic resonance phenomenon that an HID lamp L produces after it reaches its stable lamp operating condition. It is recognized that a metal halide lamp, which is an HID lamp, acoustically resonates if it is lit at a high frequency. HID lamps having different rated powers acoustically resonate at different frequencies. In this embodiment, this phenomenon is utilized to discriminate the rated power of the HID lamp L. As is the case with the embodiment shown in FIG. 11, the ballast includes a microprocessor 430, into which the current monitor 38, the voltage monitor 36 and the power controller 60 are incorporated in addition to a lamp power switching means 400. The lamp power switching means 400 discriminates the power of the HID lamp L on the basis of the acoustic resonance phenomenon that occurs after the lamp reaches its stable lamp operating condition. The lamp power switching means 400 can identify the acoustic resonance phenomenon on the basis of the variation in lamp voltage, lamp current or lamp power caused when the resonance phenomenon occurs. The lamp power switching means 400 includes an acoustic resonance identification unit 470 in it, which identifies the occurrence of acoustic resonance phenomena on the basis of lamp voltage variations. If the identification unit 470 identifies the occurrence of an acoustic resonance phenomenon, it sends the lamp discriminator 420 a signal indicative of this phenomenon. In response to this signal, the lamp discriminator 420 acquires from a frequency monitor 480 the basic frequency at the time when the acoustic resonance phenomenon occurs. The memory 432 stores the frequencies at which HID lamps L having different rated powers acoustically resonate. Referring to the memory 432, the lamp discriminator 420 determines which of the rated lamp powers is associated with the detected frequency. The lamp discriminator 420 provides the power controller 60 with a power signal indicative of the determined lamp power so that the ballast output power can be adjusted to the adequate value. In the meantime, the power controller 60 is sent a command for lighting the HID lamp L at such a low frequency that no acoustic resonance phenomenon occurs. In accordance with this command, the inverter 40 is driven at the adequate frequency. Immediately after the HID lamp L starts operating, the timer 410 starts counting the time it takes the lamp to be presumed to have reached a point after the point when it is lit stably. At the counted time, the discriminator 420 performs the foregoing discrimination. As is the case with the foregoing embodiment(s), the selector 450 determines an initial set value of ballast output power. The acoustic resonance phenomenon could be identified on the basis of, not only the lamp voltage, but also a flicker or extinction of the optical output from the HID lamp L. To this end, the acoustic resonance identification unit 470 might identify the acoustic resonance phenomenon on the basis of the output from an optical output monitor.

Figure 14:
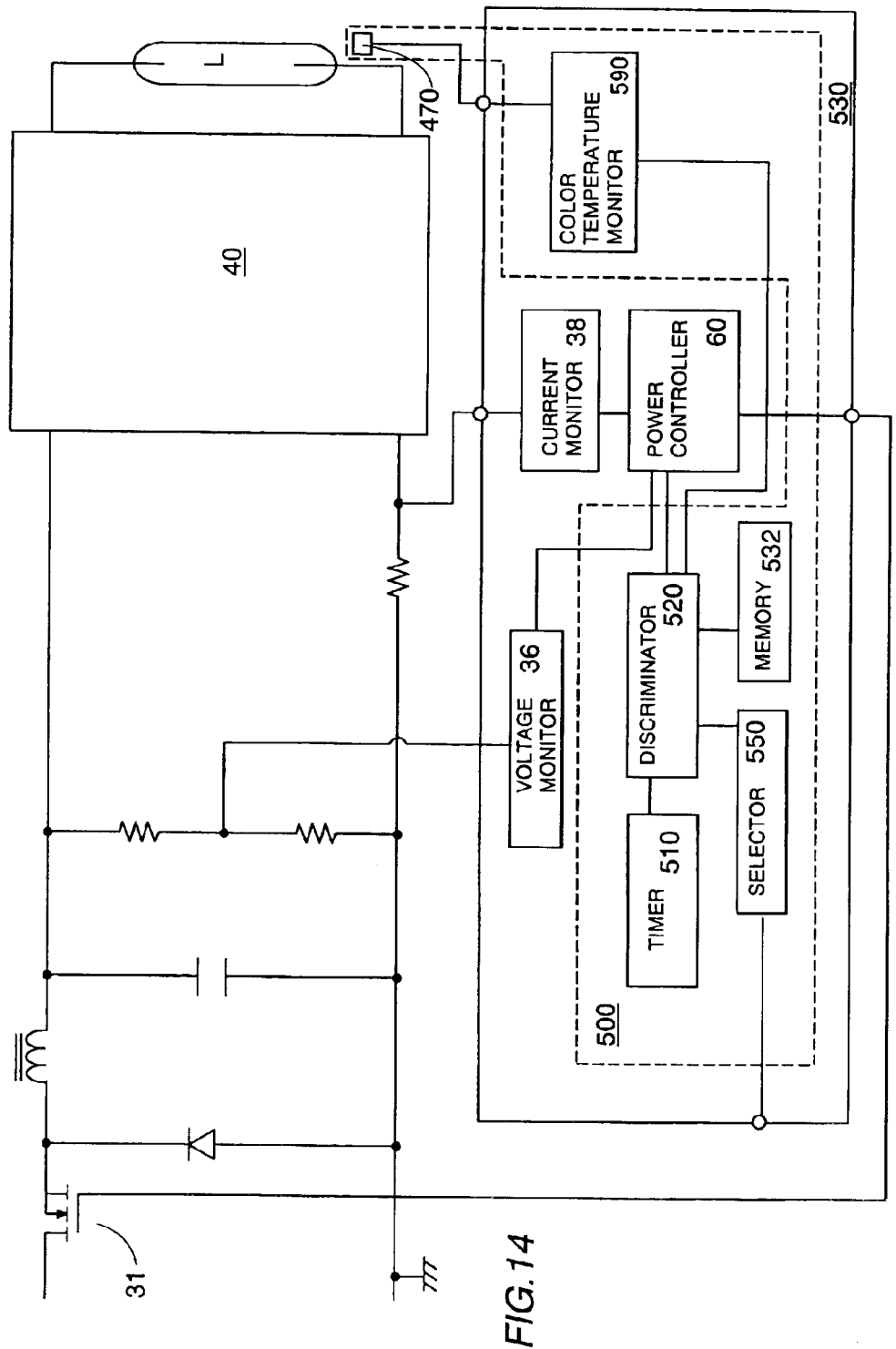
FIG. 14 is a circuit diagram showing an electronic ballast for a high intensity discharge lamp according to a seventh embodiment of the present invention.

FIG. 14 shows a ballast for a high intensity discharge lamp according to a seventh embodiment of the present invention. This embodiment bases the discrimination of lamp power on the color temperature Tc that an HID lamp L exhibits after it reaches its stable lamp operating condition. The color temperature Tc depends on the vapor pressure of the two or more halogen compounds enclosed in the light emitting tube of the HID lamp L. If the supplied power is excessive or short in comparison with that at the time when the HID lamp is lit at its rated power, the balance of vapor pressure of the halogen compounds differs from that attained when the rated power is supplied. In this case, the HID lamp L exhibits a color temperature different from its rated color temperature, which is the color temperature that the lamp exhibits when it is lit at its rated power. This embodiment takes advantage of this phenomenon to discriminate the rated power of the HID lamp L so as to supply the adequate ballast output power. For example, Matsushita Electric Industrial Co., Ltd. manufactures ceramic metal halide lamps, which are HID lamps, their commercial name being Panabeam. Some of these lamps have a rated color temperature of 3500K and rated powers of 70 W and 150 W. When the HID lamps having this rated color temperature and these rated powers were lit at output ballast powers of 70 W and 150 W, the color temperatures shown below in Table 3 were measured.

TABLE 3

| Ballast output power | Rated lamp power | Color temperature |
|---|---|---|
| 70 W | 70 W | 3400 K |
| 70 W | 150 W | 3800 K |
| 150 W | 70 W | 3400 K |
| 150 W | 150 W | 3800 K |

The color temperature of 3400K measured at the time of rated lighting differed by about 100K from the rated color temperature of 3500K. The color temperature of 3800K measured when each of the HID lamps was lit at the power over or under its rated power differs greatly by 300K from the rated color temperature. By taking advantage of these differences, it is possible to discriminate the rated powers of the HID lamps L.

As is the case with the embodiment shown in FIG. 12, this ballast includes a microprocessor 530, into which the current monitor 38, the voltage monitor 36 and the power controller 60 are incorporated in addition to a lamp power switching means 500. The lamp power switching means 500 includes a color temperature monitor 590, which detects the color temperature that an HID lamp L exhibits after it reaches its stable lamp operating condition. A color temperature signal indicative of the detected color temperature is sent to a discriminator 520. A memory 532 stores the present ballast output power and the color temperatures that HID lamps L having different rated powers exhibit after they reach their stable lamp operating conditions. Referring to the memory 532, the discriminator 520 determines which of the rated lamp powers is associated with the detected color temperature. The discriminator 520 provides a power signal indicative of the determined lamp power to the power controller 60 so as to adjust the ballast output power to the adequate value. Immediately after the HID lamp L starts operating, the timer 410 starts counting the time it takes the lamp to be presumed to have reached a point after the point when it is lit stably. At the counted time, the discriminator 520 performs the foregoing discrimination. As is the case with the foregoing embodiment(s), a selector 550 determines an initial set value of ballast output power, which is stored in the memory 532. The rated lamp power discriminated by the discriminator 520 is sent to the memory 532, where the initial set value is updated with the discriminated lamp power.

The discrimination of rated lamp power can be based on a color (chromaticity) deviation Duv from a black body locus, in place of a color temperature. If an HID lamp L is lit at a ballast output power different from its rated power, its color deviation Duv varies greatly. For example, if Panabeam HID lamps having a rated color temperature of 3500K and rated powers of 70 W and 150 W are lit at output ballast powers of 70 W and 150 W, the color deviations Duv shown below in Table 4 are measured.

TABLE 4

| Ballast output power | Rated lamp power | Color deviation(Duv) |
|---|---|---|
| 70 W | 70 W | 0.0086 |
| 70 W | 150 W | 0.0125 |
| 150 W | 70 W | 0.0128 |
| 150 W | 150 W | 0.0002 |

Thus, if each of the HID lamps is lit at the ballast output power over or under its rated power, its color deviation Duv is 1.5–60 times as large as that at the time when it is lit at its rated power. These variations can be utilized to discriminate the rated power of an HID lamp so as to adjust the ballast output power to the value adequate for the discriminated power. A ballast for realizing this purpose is similar to the ballast shown in FIG. 13, but differs from it in including a color deviation monitor in place of the color temperature monitor 590 in FIG. 13. The memory 532 stores the present ballast output power and the color deviations Duv that HID lamps L having different rated powers exhibit after they reach their stable lamp operating conditions.

In each of the embodiments, the rated lamp of the HID lamp connected to the ballast is discriminated, and the output from the ballast is changed according to it. However, the present invention is not limited to the embodiments, but also covers an embodiment in which, if a discriminated rated lamp power differs from the ballast output powers preset in a ballast, the ballast output power from a power converter is stopped. Specifically, with the embodiment of FIG. 10 taken for instance, the memory 232 might store one or more default established ballast output powers. If the rated lamp power discriminated by the lamp discriminator 220 differs from the predefined power or powers, the power controller 60 is provided with a stop signal so as to top the ballast output power from the power converter.

In the foregoing embodiments, the rated powers of HID lamps are discriminated on the basis of lamp output parameters that are output characteristics of the lamps. The lamp output parameters are the lamp voltages, the frequencies at which the lamps acoustically resonate, the color temperatures and the color deviations. However, the lamp output parameters for the present invention are not limited to these characteristics, but may include any other electrical and optical characteristics.

It is further possible to provide useful ballasts by optionally combining original or unique features in the embodiments.

What is claimed is:

1. An electronic ballast for a high intensity discharge (HID) lamp, said ballast comprising:
   a power converter configured to convert an input DC voltage into a ballast output power for driving said HID lamp;
   a controller configured to control said power converter to vary said ballast output power being supplied to said HID lamp; and
   a lamp vower switch configured to monitor a lamp output parameter that said HID lamp exhibits after it starts discharging, discriminate a rated lamp power of said HID lamp based upon said monitored lamp output parameter, and provide a lamp power signal indicative of the discriminated rated lamp power.
   said lamp power switch comprising:
      a monitor configured to keep monitoring said lamp output parameter before said HID lamp comes into a stable lamp operating condition;
      a timer configured to start counting a time when said HID lamp starts discharging, and output an enabling signal when said counted time exceeds a predetermined time; and
      a lamp discriminator configured to compare said lamp output parameter with a predetermined reference value upon receiving said enabling signal, and provide said lamp power signal when said lamp output parameter satisfies a predetermined criteria; and
   said controller being configured to vary said ballast output power to match with said rated lamp power of said HID lamp according to said lamp power signal received.

2. The ballast as set forth in claim 1, wherein said lamp output parameter is a transient lamp characteristic selected from a group consisting of a lamp voltage, a lamp current, and an optical characteristic that the HID lamp exhibits after it starts discharging and before it comes into the stable lamp operating condition.

3. The ballast as set forth in claim 2, wherein said lamp output parameter is a lamp voltage.

4. The ballast as set forth in claim 1, wherein said lamp power switch further comprises a rest counter configured to record a lamp rest time from a turn-off of said ballast to a restarting of said ballast, and provide to said comparator a rest signal which varies said reference value in accordance with said lamp rest time.

5. The ballast as set forth in claim 1, wherein
said lamp power switch further comprises a lamp aging monitor configured to monitor said lamp output parameter to determine a degree of a lamp aging, and
said lamp aging monitor configured to provide an aging signal indicative of said degree which varies said reference value for compensation of said lamp aging in discriminating said rated lamp power.

6. The ballast as set forth in claim 1, wherein said lamp output parameter is a lamp characteristic selected from a group consisting of a lamp voltage, a lamp current, and an optical characteristic that the HID lamp exhibits after it comes into the stable operating condition.

7. The ballast as set forth in claim 6, wherein said lamp output parameter is a lamp voltage.

8. The ballast as set forth in claim 1, wherein said timer configured to provide another enabling signal after a predetermined interval from the time of providing said enabling signal so that said lamp discriminator responds to provide another lamp power signal indicative of the rated lamp power located at the timing of providing said another enabling signal, whereby said controller configured to vary said ballast output power in match with the rated lamp power located last.

9. An electronic ballast for a high intensity discharge (HID) lamp, said ballast comprising:
   a power converter configured to convert an input DC voltage into a ballast output power for driving said HID lamp;
   a controller configured to control said power converter to vary said ballast output power being supplied to said HID lamp; and
   a lamp power switch configured to monitor a lamp output parameter that said HID lamp exhibits after it starts discharging, discriminate a rated lamp power of said HID lamp based upon said monitored lamp output parameter, and provide a lamp power signal indicative of the discriminated rated lamp power,
   said lamp power switch comprising:
      a monitor configured to monitor said lamp output parameter before said HID lamp comes into a stable lamp operating condition, and provide a detection signal when said lamp output parameter exceeds a critical level;
      a timer configured to start counting a time upon beginning of the discharging by said HID lamp and stop counting the time upon receiving of said detection signal, thereby giving an accumulated time period from the beginning of the discharging to the receiving of said detection signal; and
      a lamp discriminator configured to compare said accumulated time period with a predetermined reference time and provide said lamp power signal when said accumulated time period satisfies a predetermined criteria, and said controller configured to vary said ballast output power to match with said rated lamp power of said HID lamp according to said lamp power signal received.

10. The ballast as set forth in claim 9, wherein said lamp output parameter is a transient lamp characteristic selected from a group consisting of a lamp voltage, a lamp current, and an optical characteristic that the HID lamp exhibits after it starts discharging and before it comes into the stable lamp operating condition.

11. The ballast as set forth in claim 10, wherein said lamp output parameter is a lamp voltage.

12. The ballast as set forth in claim 9, wherein said lamp power switch further comprises a rest counter configured to record a lamp rest time from a turn-off of said ballast to a restarting of said ballast, and provide to said comparator a rest signal which varies said reference time in accordance with said lamp rest time.

13. The ballast as set forth in claim 9, wherein
said lamp power switch further comprises a lamp aging monitor configured to monitor said lamp output parameter to determine a degree of a lamp aging, and
said lamp aging monitor configured to provide an aging signal indicative of said degree which varies said reference time for compensation of said lamp aging in discriminating said rated lamp power.

14. The ballast as set forth in claim 9, wherein said timer configured to provide another enabling signal after a predetermined interval from the time of providing said enabling signal so that said lamp discriminator responds to provide another lamp power signal indicative of the rated lamp power located at the timing of providing said another enabling signal, whereby said controller configured to vary said ballast output power in match with the rated lamp power located last.

15. An electronic ballast for a high intensity discharge (HID) lamp, said ballast comprising:
a power converter configured to convert an input DC voltage into a ballast output power for driving said HID lamp;
a controller configured to control said power converter to vary said ballast output power being supplied to said HID lamp; and
a lamp power switch configured to monitor a lamp output parameter that said HID lamp exhibits after it starts discharging, discriminate a rated lamp power of said HID lamp based upon said monitored lamp output parameter, and provide a lamp power signal indicative of the discriminated rated lamp power,
said lamp power switch comprising:
a monitor configured to keep monitoring said lamp output parameter after said HID lamp comes into a stable lamp operating condition;
a timer configured to start counting a time when said HID lamp starts discharging and provide an enabling signal when said counted time exceeds a predetermined time indicative of that said HID lamp comes into the stable lamp operating condition;
a memory configured to store the lamp output parameter that the HID lamp exhibits after reaching the stable lamp operating condition, said lamp output parameter being predetermined for each of different combinations of said ballast output power and said rated lamp power; and
a lamp discriminator configured to reference said memory upon receiving said enabling signal to locate one of said rated lamp power in match with the lamp output parameter being monitored, and provide said lamp power signal indicative of the located rated lamp power, and
said controller configured to receive said lamb power signal and vary said ballast output power in match with the located rated lamp power.

16. The ballast as set forth in claim 15, wherein said timer configured to provide another enabling signal after a predetermined interval from the time of providing said enabling signal so that said lamp discriminator responds to provide another lamp power signal indicative of the rated lamp power located at the timing of providing said another enabling signal, whereby said controller configured to vary said ballast output power in match with the rated lamp power located last.

17. An electronic ballast for a high intensity discharge (HID) lamp, said ballast comprising:
a power converter configured to convert an input DC voltage into a ballast output power for driving said HID lamp;
a controller configured to control said power converter to vary said ballast output power being supplied to said HID lamp; and
a lamp power switch configured to monitor a lamp output parameter that said HID lamp, exhibits after it starts discharging, discriminate a rated lamp power of said HID lamp based upon said monitored lamp output parameter, and provide a lamp power signal indicative of the discriminated rated lamp power,
said lamp power switch comprising:
a frequency monitor configured to keep monitoring a frequency about which said HID lamp gives an acoustic resonance after said HID lamp comes into a stable lamp operating condition;
a memory configured to store said frequency that the HID lamp exhibits after reaching the stable lamp operating condition, said frequency being predetermined for each of different combinations of said ballast output power and said rated lamp power; and
a lamp discriminator configured to reference said memory to locate one of said rated lamp power in match with said frequency being monitored, and provide said lamp power signal indicative of the located rated lamp power, and
said controller configured to receive said lamp power signal and vary said ballast output power in match with the located rated lamp power.

18. An electronic ballast for a high intensity discharge (HID) lamp, said ballast comprising:
a power converter configured to convert an input DC voltage into a ballast output power for driving said HID lamp;
a controller configured to control said power converter to vary said ballast output power being supplied to said HID lamp; and
a lamp power switch configured to monitor a lamp output parameter that said HID lamp exhibits after it starts discharging, discriminate a rated lamp power of said HID lamp based upon said monitored lamp output parameter, and provide a lamp power signal indicative of the discriminated rated lamp power,
said lamp power switch comprising:
a memory configured to store a plurality of different said ballast output powers; and
a selector configured to select one of said ballast output power as a default one to be initially supplied to said HID lamp,
said selector having an input terminal configured to receive an external signal by which said selector is activated to select any one of said ballast output power as said default one, and
said controller configured to receive said lamp power signal and vary said ballast output power in match with said rated lamp power.

19. The ballast as set forth in claim 18, wherein said lamp power switch is configured to store in said memory the rated lamp power as an updated lamp power each time it is discriminated, and said selector configured to assign said updated lamp power as said default one each time said ballast is activated.

20. An electronic ballast for a high intensity discharge (HID) lamp, said ballast comprising:

a power converter configured to convert an input DC voltage into a ballast output power for driving said HID lamp;

a controller configured to control said power converter to vary said ballast output power being supplied to said HID lamp; and a lamp power switch configured to monitor a lamp output parameter that said HID lamp exhibits after it starts discharging, discriminate a rated lamp power of said HID lamp based upon said monitored lamp output parameter, and provide a lamp power signal indicative of the discriminated rated lamp power, said lamp power switch comprising a lamp life monitor configured to monitor said lamp output parameter to provide a life-end signal when said HID lamp is determined by said lamp output parameter to come into near end-of-life condition, and said controller configured to vary said ballast output power in match with said rated lamp power according to said lamp power signal received, and respond to said life-end signal for reducing said ballast output power to a minimum.

21. An electronic ballast for a high intensity discharge (HID) lamp, said ballast comprising:

a power converter configured to convert an input DC voltage into a ballast output power for driving said HID lamp;

a controller configured to control said power converter to vary said ballast output power being supplied to said HID lamp; and a lamp power switch configured to monitor a lamp output parameter that said HID lamp exhibits after it starts discharging, discriminate a rated lamp power of said HID lamp based upon said monitored lamp output parameter, and provide a lamp power signal indicative of the discriminated rated lamp power.

said lamp power switch comprising:

a color temperature monitor configured to monitor a color temperature that said HID lamp exhibits after it comes into a stable lamp operating condition;

a memory configured to store said color temperature that the HID lamp exhibits after reaching the stable lamp operating condition, said color temperature being predetermined for each of different combinations of said ballast output power and said rated lamp power; and a lamp discriminator configured to reference said memory to locate one of said rated lamp power in match with said color temperature being monitored, and provide said lamp power signal indicative of the located rated lamp power, and said controller configured to receive said lamp power signal and vary said ballast output power in match with the located rated lamp power.

22. An electronic ballast for a high intensity discharge (HID) lamp, said ballast comprising:

a power converter configured to convert an input DC voltage into a ballast output power for driving said HID lamp;

a controller configured to control said power converter to vary said ballast output power being supplied to said HID lamp; and a lamp power switch configured to monitor a lamp output parameter that said HID lamp exhibits after it starts discharging, discriminate a rated lamp power of said HID lamp based upon said monitored lamp output parameter, and provide a lamp power signal indicative of the discriminated rated lamp power.

said lamp power switch comprising:

a color deviation monitor configured to monitor a color difference that said HID lamp exhibits after it comes into a stable lamp operating condition;

a memory configured to store said color deviation that the HID lamp exhibits after reaching the stable lamp operating condition, said color deviation being predetermined for each of different combinations of said ballast output power and said rated lamp power; and a lamp discriminator configured to reference said memory to locate one of said rated lamp power in match with said color deviation being monitored, and provide said lamp power signal indicative of the located rated lamp power, and said controller configured to receive said lamp power signal and vary said ballast output power in match with the located rated lamp power.

23. An electronic ballast for a high intensity discharge (HID) lamp, said ballast comprising:

a power converter configured to convert an input DC voltage into a ballast output power for driving said HID lamp;

a controller configured to control said power converter to vary said ballast output power being supplied to said HID lamp; and a lamp power switch configured to monitor a lamp output parameter that said HID lamp exhibits after it starts discharging, discriminate a rated lamp power of said HID lamp based upon said monitored lamp output parameter, and provide a lamp power signal indicative of the discriminated rated lamp power, said controller configured to receive said lamp power signal and vary said ballast output power in match with said rated lamp power, said lamp power switch comprising:

a monitor configured to monitor said lamp output parameter; and a memory configured to store the lamp output parameter which is exhibited by said HID lamp and is predetermined for each of different combinations of said ballast output power and said rated lamp power; and a lamp discriminator configured to reference said memory to locate one of said rated lamp power in match with the lamp output parameter being monitored, and provide said lamp power signal indicative of the located rated lamp power, said controllers in response to said lamp power signal, configured to vary said ballast output power in match with the located rated lamp power, said memory further configured to store a plurality of ballast output powers as default established ballast output powers, said lamp power switch further comprising a verifier which issues a stop signal when said located rated lamp power is not coincident with any one of said default established ballast output powers, and said controller, in response to said stop signal, configured to cease providing said ballast output power.

24. An electronic ballast for a high intensity discharge (HID) lamp, said ballast comprising:

a power converter configured to convert an input DC voltage into a ballast output power for driving said HID lamp;

a controller configured to control said power converter to vary said ballast output power being supplied to said HID lamp; and a lamp power switch configured to monitor a lamp output parameter that said HID lamp exhibits after it starts discharging, discriminate a rated lamp power of said HID lamp based upon said monitored lamp output parameter, and provide a stop signal when said rated lamp power thus discriminated is not coincident with a default value of said ballast output power set to said ballast, said controller configured to receive said stop signal to cause said power converter to stop providing said ballast output power.

* * * * *